(12) United States Patent
Sakhartchouk et al.

(10) Patent No.: US 7,825,937 B1
(45) Date of Patent: Nov. 2, 2010

(54) MULTI-PASS CYLINDRICAL CUBE MAP BLUR

(75) Inventors: Alexei Sakhartchouk, San Carlos, CA (US); Ryan M. Geiss, Santa Cruz, CA (US)

(73) Assignee: NVIDIA Corporation, Santa Clara, CA (US)

( * ) Notice: Subject to any disclaimer, the term of this patent is extended or adjusted under 35 U.S.C. 154(b) by 473 days.

(21) Appl. No.: 11/454,253

(22) Filed: Jun. 16, 2006

(51) Int. Cl.
G09G 5/00 (2006.01)
G06T 15/50 (2006.01)

(52) U.S. Cl. ........................................ 345/582; 345/426

(58) Field of Classification Search ................ 345/426, 345/582
See application file for complete search history.

(56) References Cited

U.S. PATENT DOCUMENTS

| | | | |
|---|---|---|---|
| 4,998,165 A | 3/1991 | Lindstrom | |
| 5,651,104 A * | 7/1997 | Cosman | 345/428 |
| 5,704,024 A * | 12/1997 | Voorhies et al. | 345/426 |
| 5,831,620 A * | 11/1998 | Kichury, Jr. | 345/419 |
| 5,920,407 A | 7/1999 | Erickson et al. | |
| 5,940,067 A | 8/1999 | Greene | |
| 6,236,405 B1 * | 5/2001 | Schilling et al. | 345/582 |
| 6,591,004 B1 | 7/2003 | Vanessen et al. | |
| 6,664,963 B1 * | 12/2003 | Zatz | 345/426 |
| 6,697,062 B1 * | 2/2004 | Cabral et al. | 345/419 |
| 6,710,658 B2 | 3/2004 | Griepentrog | |
| 6,828,980 B1 * | 12/2004 | Moreton et al. | 345/582 |
| 6,844,881 B1 | 1/2005 | Chen et al. | |
| 2001/0031920 A1 | 10/2001 | Kaufman et al. | |
| 2003/0112237 A1 * | 6/2003 | Corbetta | 345/426 |
| 2003/0128337 A1 | 7/2003 | Jaynes et al. | |
| 2003/0164960 A1 | 9/2003 | Housel | |
| 2003/0179197 A1 * | 9/2003 | Sloan et al. | 345/426 |
| 2004/0001645 A1 * | 1/2004 | Snyder | 382/276 |
| 2004/0009459 A1 | 1/2004 | Anderson et al. | |
| 2004/0075661 A1 * | 4/2004 | Yamaguchi et al. | 345/441 |
| 2004/0222988 A1 * | 11/2004 | Donnelly | 345/419 |
| 2004/0263511 A1 | 12/2004 | West et al. | |
| 2005/0017983 A1 * | 1/2005 | Liao et al. | 345/582 |
| 2005/0104883 A1 | 5/2005 | Snyder et al. | |
| 2005/0128196 A1 * | 6/2005 | Popescu et al. | 345/420 |
| 2005/0140694 A1 * | 6/2005 | Subramanian et al. | 345/619 |

(Continued)

OTHER PUBLICATIONS

Voorhies et al.; Reflection vector shading hardware; 1994; ACM; SIGGRAPH Proceedings, pp. 163-166.*

(Continued)

*Primary Examiner*—Xiao M Wu
*Assistant Examiner*—David T Welch
(74) *Attorney, Agent, or Firm*—Patterson & Sheridan, LLP (57) ABSTRACT

One embodiment of the present invention sets forth an improved method for computing a cube map blur function. The method begins with a rendered cube map of the surrounding scene using conventional environment rendering techniques. The method then proceeds with three successive cylindrical blurs around each axis of a coordinate frame. The three blur operations accumulate results from each predecessor operation for the different pixels of the cube map, thereby generating a high quality cube map blur. One advantage of this technique is that a relatively low computational effort yields a blur function involving a relatively large number of source pixels for each resulting pixel. Therefore, the resulting cube map can be computed in real-time and is suitable for use in a wide range of lighting effects.

24 Claims, 9 Drawing Sheets

U.S. PATENT DOCUMENTS

2005/0179687 A1  8/2005  Anderson et al.
2006/0146295 A1  7/2006  Harboe
2007/0018996 A1  1/2007  Wang et al.

OTHER PUBLICATIONS

Heidrich et al.; Realistic hardware-accelerated shading and lighting; 1999; ACM; SIGGRAPH Proceedings, pp. 171-178.*

Kautz et al.; Approximation of glossy reflection with prefiltered environment maps; 2000; Graphics Interface proceedings.*

Kautz et al; Fast arbitrary BRDF shading for low-frequency lighting using spherical harmonics; 2002; Eurographics Association; ACM International Conference proceedings; vol. 28; pp. 291-296.*

Green et al; High Dynamic Range Rendering on the GeForce 6800; 2004; NVIDIA's HDRR Technical Summary.*

GPU Programming Exposed: The Naked Truth Behind NVIDIA's Demos; Aug. 4, 2005; SIGGRAPH Proceedings; pp. 1-8 and 96-105.*

Supan et al; Interactive image based lighting in augmented reality; Apr. 25, 2006; Central European Seminar on Computer Graphics Proceedings.*

Office Action, U.S. Appl. No. 11/454,541 dtd. Dec. 21, 2009.

Borshukov, et al. 'Realistic Human Face Rendering for "The Matrix Reloaded", ESC Entertainment, SIGGRAPH 2003, http://www.virtualcinematography.org/publications/acrobat/Face-s2003.pdf.

Dachsbacher, et al. "Translucent Shadow Maps", Eurographics Symposium on Rendering 2003, http://www.eg.org/EG/DL/WS/EGWR03/197-201.pdf.

* cited by examiner

MULTI-PASS CYLINDRICAL CUBE MAP BLUR

BACKGROUND OF THE INVENTION

1. Field of the Invention

Embodiments of the present invention relate generally to computer graphics and more specifically to multi-pass spherical cube map blurring.

2. Description of the Related Art

Cube maps are useful for a variety of effects in computer graphics. For example, cube maps may serve as source data for well-known reflection and lighting effects within rendered computer graphics scenes. Cube maps generally include six texture map surfaces, one for each cube face, that represent some environmental detail, such as illuminated color. The cube map is commonly centered about a three-dimensional Cartesian origin, with each cube face intersected through its center by one of the coordinate axes. Data from the cube map is accessed using a direction vector emanating from the origin. With the cube map completely enclosing the origin, any direction vector intersects some portion of the cube map. Data from the cube faces may be sampled using a variety of well-known techniques such as point sampling or bilinear sampling.

One particularly useful application of the cube map is in applying environmentally realistic lighting to one or more objects in a rendered computer graphics scene. For example, an object in a rendered computer graphics scene with a diffuse white light environment generally would be illuminated with diffuse white light. Furthermore, if a colored light source is in close proximity to the rendered object, then the rendered object should also be directionally illuminated from the colored light source. A graphics scene may contain a complex combination of such light sources. To produce realistic and visually pleasing lighting effects in these types of scenes, a technique referred to as "cube map lighting" may be used that employs a cube map of source data that embodies the realistic lighting environment surrounding the object being rendered. The lighting information embodied in the cube map is then used to impart realistic environmental lighting effects on the object being rendered, giving the object a realistic look and feel within the context of the scene.

One common technique for generating a cube map suitable for cube map lighting uses a convolution function referred to as a "cosine weighted average of incoming radiance over a hemisphere." The convolution function attempts to emulate the actual physical process of generalized illumination and therefore gathers a very large number of samples when computing each resulting sample value in the final cube map. The light radiance gathered by the convolution operation includes, for example, indirect light emitted from directly-lit objects in the scene as well as explicit light sources in the scene. One drawback of such a process is that it can take anywhere from seconds to minutes, a time scale unsuitable for real-time rendering. Cube maps are therefore typically pre-calculated prior to when a graphics application begins operation and uses the cube maps to light one or more objects in a particular rendered scene. Consequently, a second, related drawback is that applications employing real-time rendering are then limited to static cube maps in applying cube map lighting techniques. Thus, applications typically have to restrict their use of certain environmental lighting changes and light emitting object movements because such lighting changes may invalidate the pre-calculated cube maps being used. In addition, secondary lighting effects, such as reflected light, cannot be applied to rendered objects moving within a scene using pre-calculated cube maps, further limiting overall image quality.

As the foregoing illustrates, what is needed in the art is a way to improve the efficiency and flexibility of cube map rendering techniques.

SUMMARY OF THE INVENTION

One embodiment of the present invention is a method for rendering a cube map using a spherical blur function. The method includes the steps of selecting a first pixel location on a first face of a first destination cube map that has at least six faces, computing a normal vector associated with the first pixel, determining a normal vector pixel location on a first face of a source cube map that corresponds to the first pixel location on the first face of the first destination cube map, and determining a plurality of sample positions relative to the normal vector pixel location. The method also includes the steps of generating a sample value for each sample position in the plurality of sample positions, generating a blended sample value based on the computed sample values, and writing the blended sample value to the first pixel location on the first face of the first destination cube map.

One advantage of the disclosed method is that a relatively low computational effort yields a blur function involving a relatively large number of source pixels for each resulting pixel. For example, the same level of blur achieved with order $n^3$ computations using prior art techniques may be achieved with order n computations using the disclosed method. Consequently, cube maps generated with the disclosed method may be computed in real-time and are suitable for use in a wide range of lighting effects.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

One embodiment of the present invention sets forth an improved method for computing a cube map blur function. The method begins with a rendered cube map of the surrounding scene using conventional environment rendering techniques. The method then proceeds with three successive cylindrical blurs around each axis of a coordinate frame. The three blur operations accumulate results from each predecessor operation for the different pixels of the cube map, thereby generating a high quality cube map blur. One advantage of this technique is that a relatively low computational effort yields a blur function involving a relatively large number of source pixels for each resulting pixel. Therefore, the resulting cube map can be computed in real-time and is suitable for use in a wide range of lighting effects.

Figure 1:
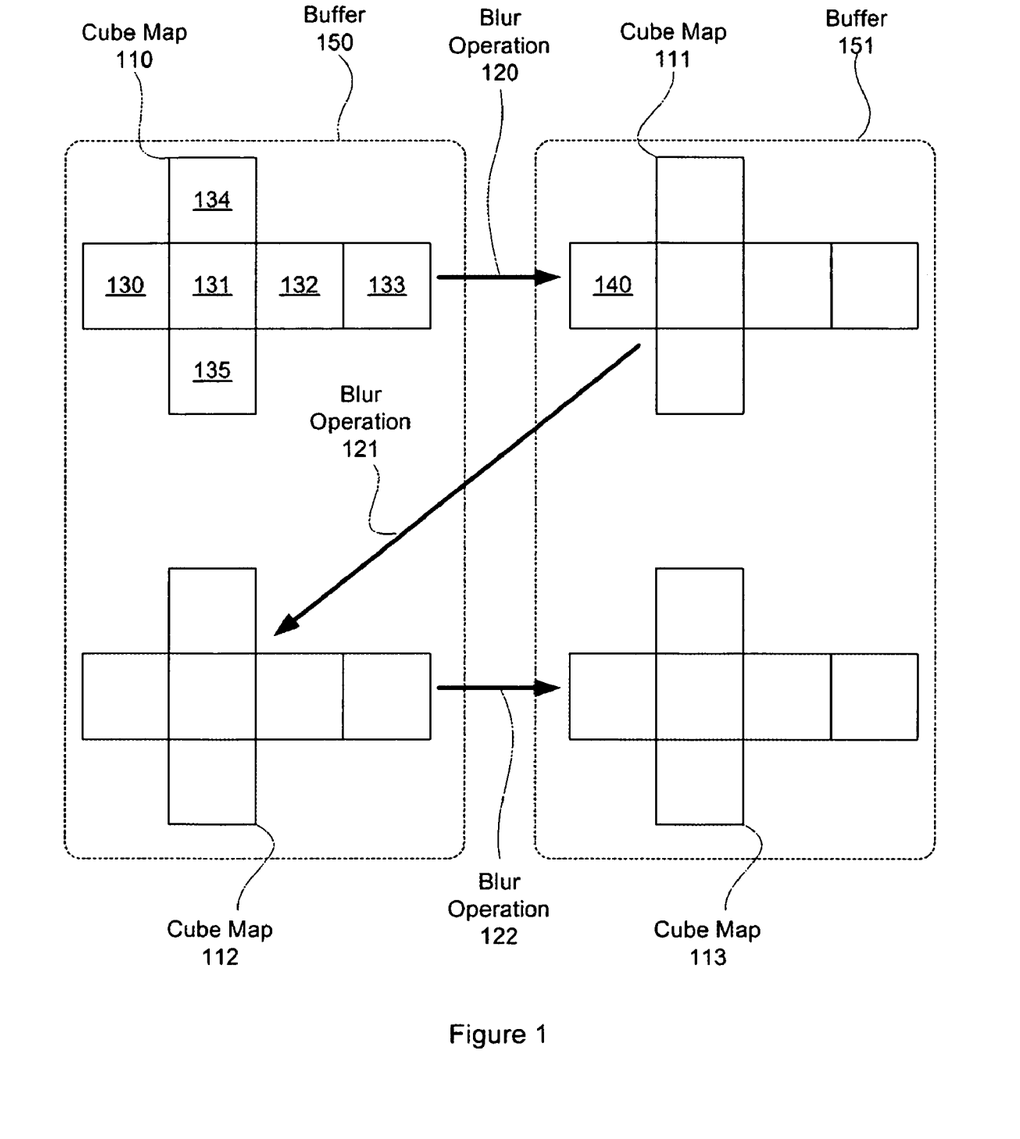
FIG. 1 is a conceptual drawing of a multi-pass blur operation sequentially applied to cube maps in a double-buffered configuration, according to one embodiment of the invention.

FIG. 1 is a conceptual drawing of a multi-pass blur operation sequentially applied to cube maps 110, 111 and 112 in a double-buffered configuration, according to one embodiment of the invention. Cube map 110 is rendered using conventional environment rendering techniques. Persons skilled in the art will recognize that cube map 110 is a representation of a given environment from the perspective of a point centered at a specified location in the environment. Cube map 110 has six cube faces 130, 131, 132, 133, 134 and 135, each with a rendered texture map of the corresponding view of the surrounding environment.

Three cylindrical blur operations 120, 121 and 122, described in greater detail below, are applied to cube map 110 to yield a cube map 113 containing the final blur results. More specifically, cube map 110 is processed using blur operation 120 to yield cube map 111; cube map 111 is processed using blur operation 121 to yield cube map 112; and cube map 112 is processed using blur operation 122 to yield cube map 113. Each of the three blur operations is conducted in relation to a different one of the three coordinate axes of a Cartesian coordinate frame. During the course of a specific blur operation, the corresponding coordinate axis about which the blur operation is conducted is referred to herein as the "blur axis." In one embodiment, cube maps 110 and 112 are stored in a first buffer 150 and cube maps 111 and 113 are stored in a second buffer 151. In this way, there is always a source buffer and a destination buffer available for blur operations 120, 121 and 122, where the source buffer stores the source cube map for the blur operation, and the destination buffer stores the destination cube map for the blur operation. The first buffer 150 and the second buffer 151 may be situated in frame buffer memory, system memory or any other suitable memory within the overall system implementing the cylindrical blur operations. Because cube map 110, stored in buffer 150, is not needed once cube map 111 is computed and stored in buffer 151, the data representing cube map 112 may over-write the data representing cube map 110 in buffer 150. Similarly, cube map 111, stored in buffer 151, is not needed once cube map 112 is computed, hence the data representing cube map 113 may over-write the data representing cube map 111 in buffer 151. Thus, buffers 150 and 151 form a double-buffered mechanism for storing and processing the total of four cube maps 110, 111, 112, 113, while only requiring the buffer capacity of two cube maps.

The blur operations 120, 121 and 122 render their respective destination cube map by individually rendering each cube face in the destination cube map (also referred to herein as a "destination cube face"). As described in greater detail herein, in one embodiment, rendering one destination cube face involves rendering all pixels associated with that cube face, where a rasterization step selects the pixels to be rendered on the destination cube face. Rendering a particular pixel on the destination cube face first involves selecting a pixel location on the face of the source cube map (also referred to herein as "source cube face") corresponding to the location on the destination cube face of the pixel being rendered. Then, one or more pixels from the source cube map located, at or around the selected pixel location are blended, and the blended data is written to the corresponding pixel location on the destination cube face.

Figure 2A:
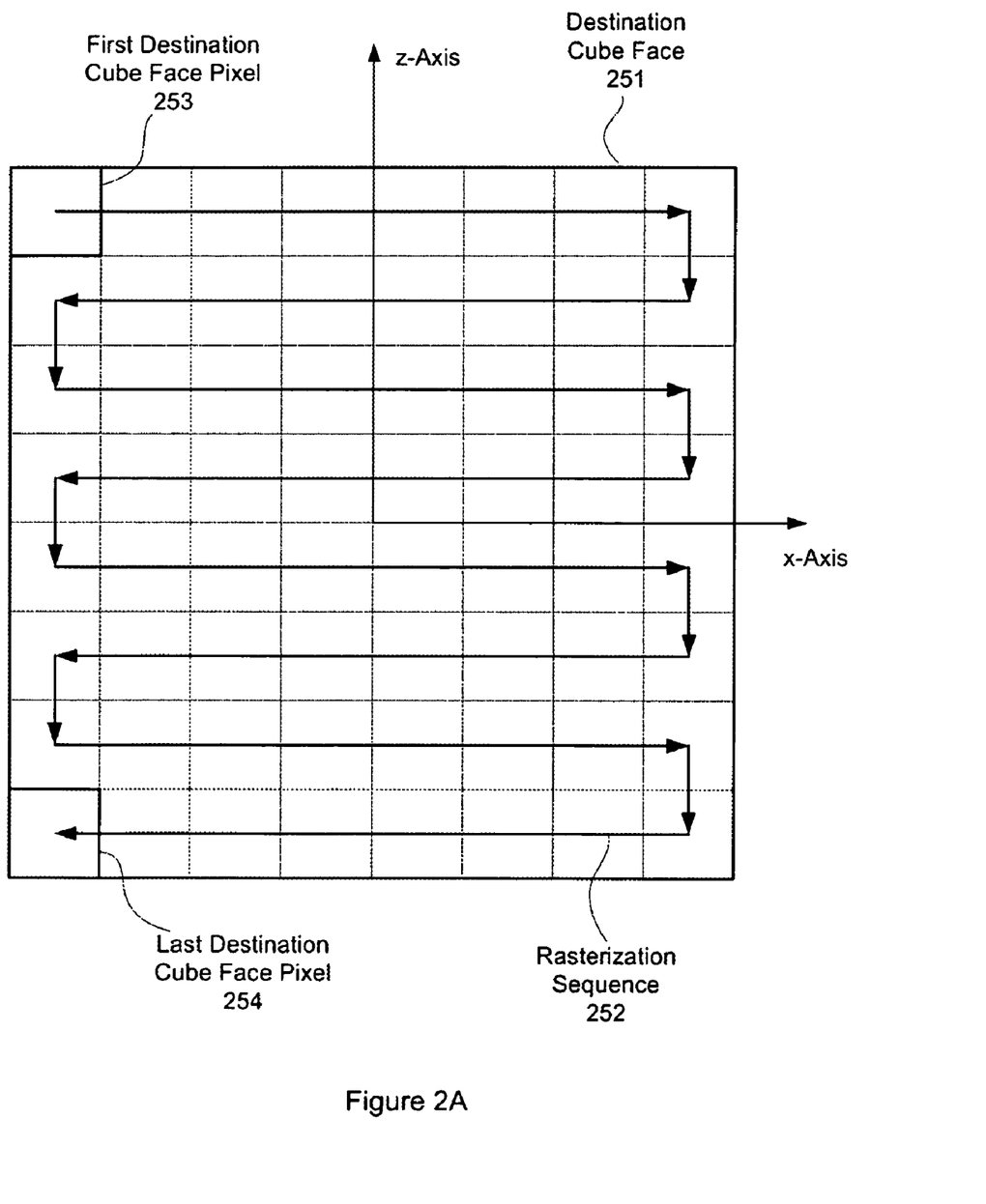
FIG. 2A illustrates an example of a rasterization sequence on a cube face of a destination cube map, according to one embodiment of the invention.

FIG. 2A illustrates an example of a rasterization sequence 252 on a cube face 251 of a destination cube map, according to one embodiment of the invention. As persons skilled in the art will recognize, the rasterization coverage of the destination cube face 251 aligns with the camera view frustum corresponding to a 90-degree total viewing angle when the camera points parallel to the y-axis. Rasterization begins with a first destination cube face pixel 253 and follows the rasterization sequence 252 until the last destination cube face pixel 254 is processed. The rasterization process may follow the rasterization sequence 252, which is linear and sequential in each dimension, or any other technically feasible rasterization sequence providing appropriate geometric coverage of the destination cube face 251. In one embodiment, each cube face of the destination cube map is rendered in substantially the same way, according to the orientation of the particular cube face being rendered.

Figure 2B:
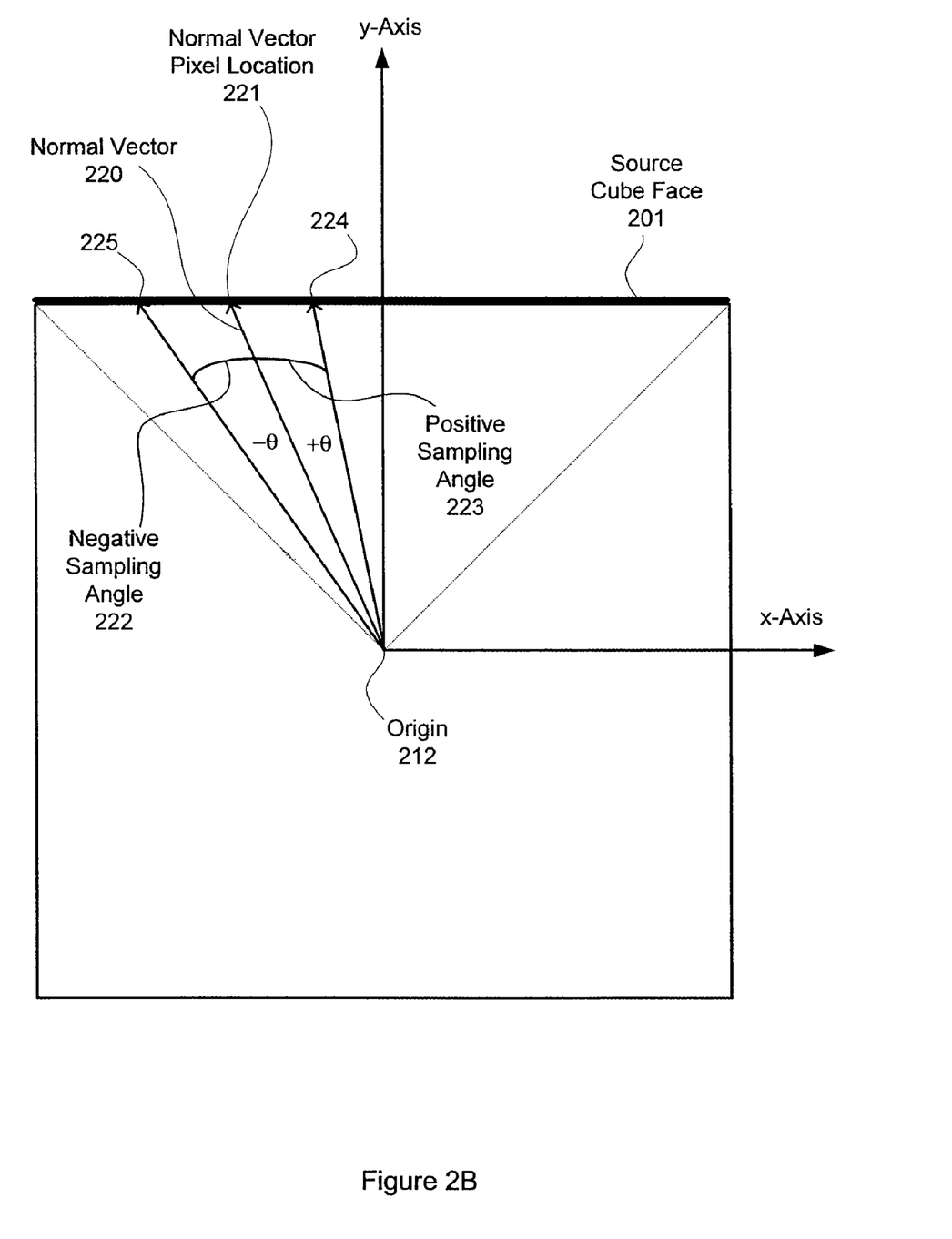
FIG. 2B is a conceptual illustration of the sampling process from a cube face of a source cube map, according to one embodiment of the invention.

FIG. 2B is a conceptual illustration of the sampling process used on a cube face 201 of a source cube map, according to one embodiment of the invention. As shown, the y-axis intersects the center of the source cube face 201 at an origin 212. The z-axis is oriented orthogonally to both the y-axis and x-axis in the figure. Conventional cube mapping process steps may be used to compute a normal vector 220, which is repeatedly modified and then used to sample the various locations on the source cube face 201. Each such location is referred to herein as a "normal vector pixel location." Normal vector pixel locations 221, 224 and 225 are examples of such normal vector pixel locations. Importantly, the sampling process of FIG. 2B differs from conventional cube map sampling in that the sampling process is conducted in three stages, each stage requiring only a modest computational load.

Persons skilled in the art will recognized that various methods, such as point sampling, bilinear sampling and bicubic sampling, may be used to generate each sample value from a source cube map. In point sampling, one source pixel is fetched from the source cube map in generating the source cube map sample value. In bilinear sampling, four source pixels are fetched from a 2×2 pattern and blended together to generate the source cube map sample value. Therefore, in certain cases, bilinear sampling may involve adjacent source cube faces in sampling the 2×2 pixel pattern, for example when the 2×2 pixel pattern is split along the seam between two source cube faces.

In addition to the normal vector 220, two other parameters also guide the sampling process: the blur angle and the number of samples to be taken in along the blur angle. As illustrated in FIG. 2B, the blur angle defines a positive sampling angle 223 and a negative sampling angle 222 about the blur axis (the z-axis in this case) relative to the normal vector 220 that intersects the source cube face 201 at the normal vector pixel location 221. The combined angle formed between the positive sampling angle 223 and negative sampling angle 222 is referred to as the "blur radius." For example, if the blur angle is 15 degrees, then the positive sampling angle 223 and negative sampling angle 222 are each 15 degrees and the blur radius is 30 degrees. The positive sampling angle 223, denoted by positive theta, is divided into N increments of D degrees each (not shown), rotated about the blur axis. The source cube face 201 is sampled at a location corresponding to each increment of D degrees through the range of zero to theta degrees, inclusive (each such location on the source cube face is referred to herein as a "sample location"). Likewise, the source cube face 201 is then sampled at location corresponding to each negative increment of D degrees through the range of zero to negative theta degrees, inclusive. At each sample location, a sampling is performed using one or more pixels located at or about the sample location. Again, any conventional sampling technique can be used, such as point or bilinear sampling. In one embodiment, the sample value at each sample location is given a contribution weight equal to the sample value multiplied by the cosine of the angle of rotation between the sample location and the normal vector pixel location 221. For example, if the first sample location is located at a 5 degree clockwise rotation about the z-axis from the normal vector pixel location 221, then the contribution of the first sample is equal to the cosine of 5 degrees multiplied by the value of each component (red, blue, and green) of the sample value computed for the first sample location. The weighted sample values are then combined to yield a blended pixel value for the corresponding pixel in the destination cube face. As an example, referring back to FIG. 2A, if the normal vector pixel location 221 of FIG. 2B corresponds to pixel 253 of destination cube face 251, then the blended pixel value computed using the weighted sampling technique described herein for the normal vector pixel location 221 is written to pixel 253. In one embodiment, a weighted average of the sample values is used to compute the blended pixel value that is written back to the destination cube map.

In an alternative embodiment, the weighting scheme may entail weighting each sample evenly rather than applying a cosine weighting to each sample. Such an embodiment is particularly useful in cases of small blur angles, where the cosine weight value changes only slightly over a given span of samples. In these cases, the cosine computation can be approximated as equal to one, thereby reducing overall computational load. Persons skilled in the art will understand that in yet another alternative embodiments different weighting and averaging schemes than those described herein may be used.

Each successive cylindrical blur operation 120, 121 and 122 involves applying the blur function described above to each of the six cube faces. Four of the six cube faces encircle the blur axis (this case is illustrated in FIGS. 3A and 3B below), two cube faces intersect the blur axis (this case is illustrated in FIGS. 3C and 3D below).

Figure 3A:
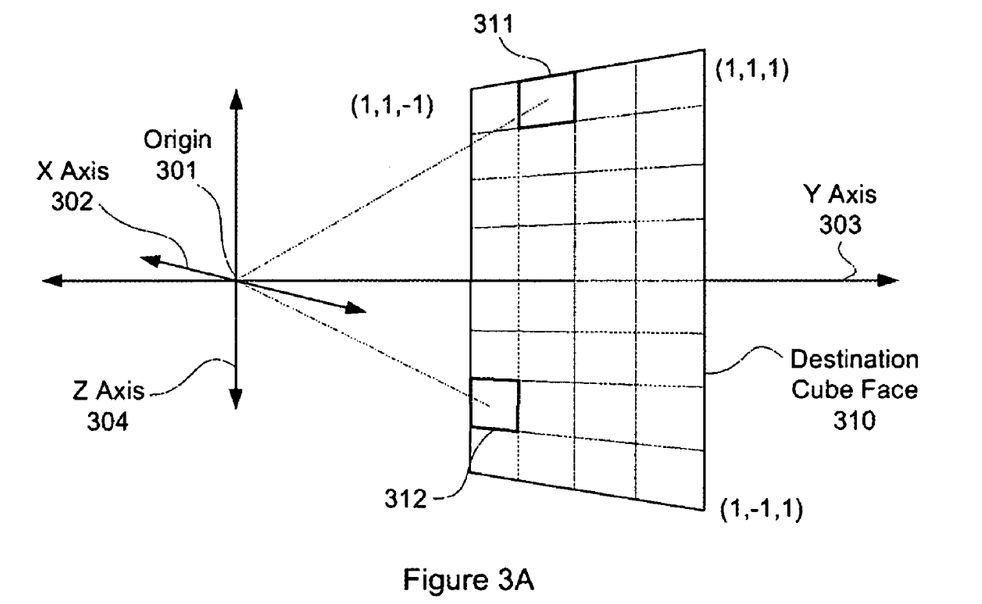
FIG. 3A is a conceptual illustration of a cube face of a destination cube map not intersected by the current blur axis, according to one embodiment of the invention.

FIG. 3A is a conceptual illustration of a cube face 310 of a destination cube map not intersected by the current blur axis, according to one embodiment of the invention. Three orthogonal coordinate axes 302, 303 and 304 are shown intersecting at an origin 301. The z-axis is the current blur axis, as illustrated below in FIG. 3B. Although, in one embodiment, all pixels on the destination cube face 310 are rendered, two pixels 311 and 312 are discussed herein for the purpose of illustration.

Figure 3B:
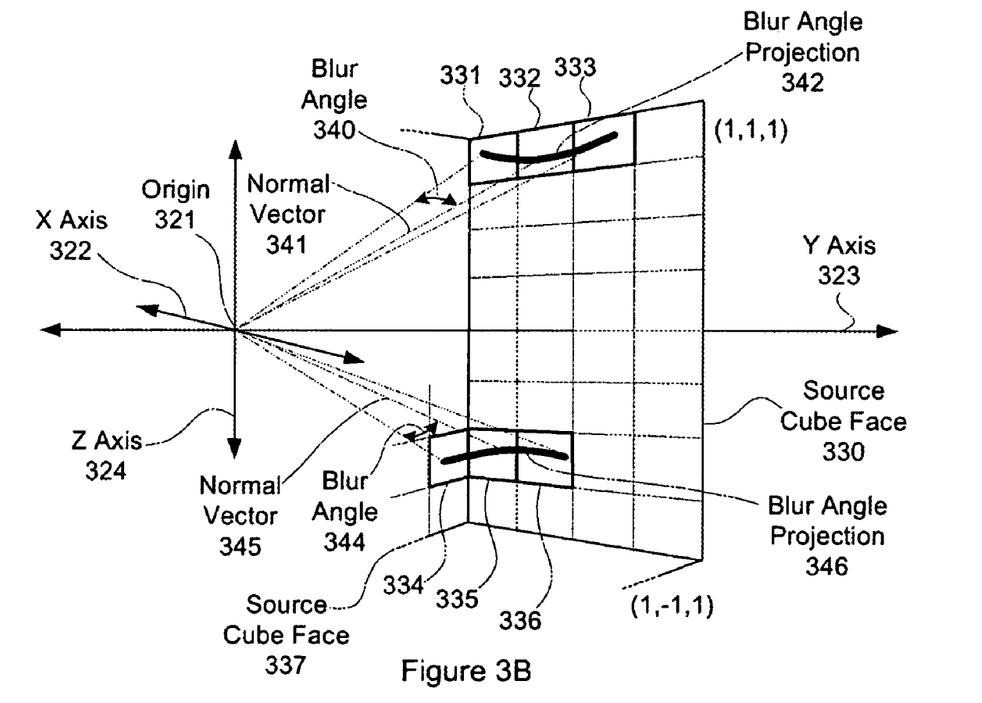
FIG. 3B is a conceptual illustration of pixels being sampled across blur angle projections on a source cube face not intersected by the current blur axis, according to one embodiment of the invention.
Figure 3C:
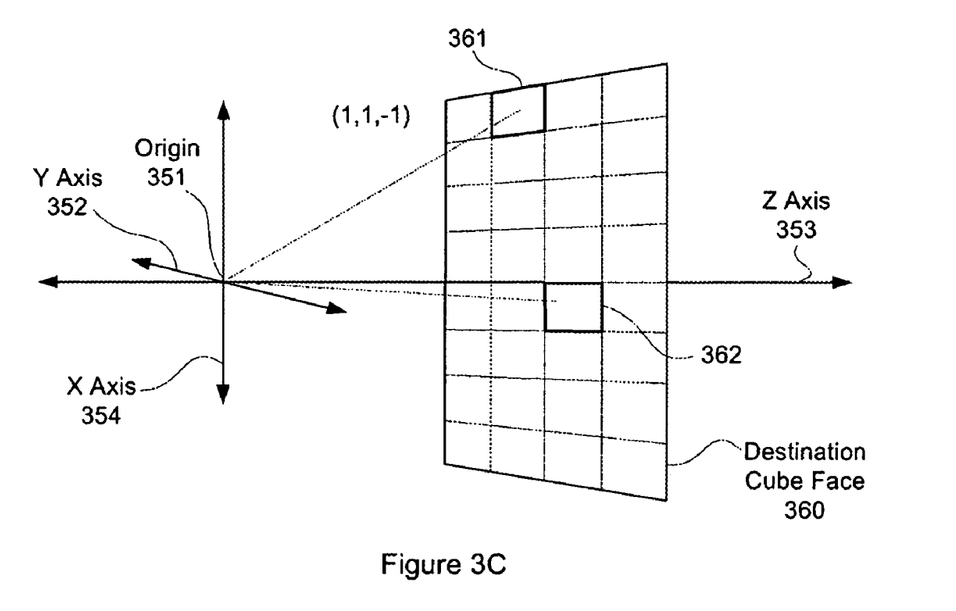
FIG. 3C is a conceptual illustration of a cube face of a destination cube map intersected by the current blur axis, according to one embodiment of the invention.
Figure 3D:
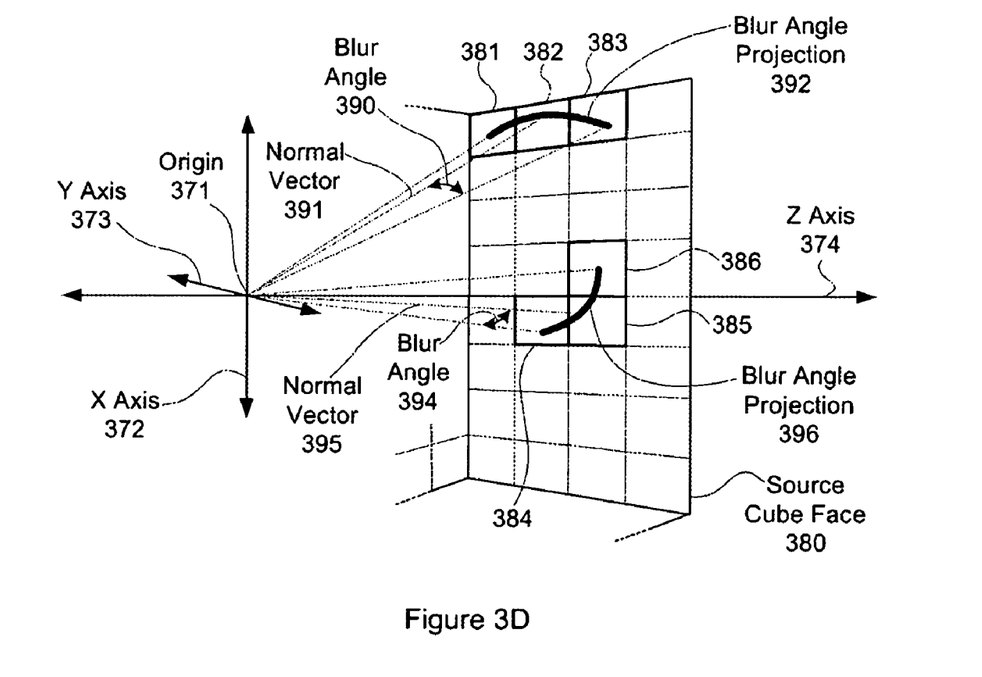
FIG. 3D is a conceptual illustration of pixels being sampled across blur angle projections on a source cube face intersected by the current blur axis, according to one embodiment of the invention.

FIG. 3B is a conceptual illustration of pixels being sampled across blur angle projections 342 and 346 on a source cube face 330 not intersected by the current blur axis, according to one embodiment of the invention. Point sampling is assumed in this discussion. Three orthogonal coordinate axes, x-axis 322, v-axis 323 and z-axis 324 are shown intersecting at an origin 321. The value of pixel 311 on destination cube face 310 of FIG. 3A is computed by sampling source pixels 331, 332 and 333 from source cube face 330, according to the weighted cosine computation discussed above. Likewise, the value of pixel 312 on destination cube face 310 of FIG. 3A is computed by sampling source pixel 335 and pixel 336 from source cube face 330 and source pixel 334 from source cube face 337, according to the weighted cosine computation discussed above. Note that blur angle projection 346 places source pixel 334 on a different source cube face than source pixels 335 and 336. Also note that the same process is followed to locate each source pixel being used for the point sampling operations, independent of the source cube face on which the source pixel resides. As persons skilled in the art will appreciate, these relationships are a natural consequence of the mechanics of conventional cube mapping.

As previously discussed, a blur angle 340 defines a positive and a negative sampling angle about the current blur axis relative to the position of a normal vector 341. In this case, the current blur axis is the z-axis 324. A blur angle projection 342 illustrates the sampling pattern on the source cube face 330 (which includes pixels 331, 332 and 333) used to compute the value of destination pixel 311. Pixel 332 is located where the normal vector 341 intersects the source cube face 330 (equivalent to normal vector pixel location 221 of FIG. 2B), pixel 331 is located at a sample location defined by the negative sample angle about the blur axis, and pixel 333 is located at a sample location defined by the positive sample angle about the blur axis. In this illustration, since the positive and negative sample angles are divided by only one increment (N=1, equivalent to D=theta in FIG. 2B), only pixels 331 and 333 participate in computing pixel 311.

Similarly, blur angle 344 defines a positive and a negative sample angle, about the current blur axis relative to the position of a normal vector 345. Again, the current blur axis is the z-axis 324. A blur angle projection 346 illustrates the sampling pattern on the source cube face 330 (which includes pixels 334, 335 and 336) used to compute the value of destination pixel 312. Pixel 335 is located where the normal vector 345 intersects the source cube face 330 (equivalent to normal vector pixel location 221 of FIG. 2B), pixel 334 is located at a sample location defined by the negative sample angle about the blur axis, and pixel 336 is located at a sample location defined by the positive sample angle about the blur axis. Again, since the positive and negative sample angles are divided by only one increment, only pixels 334 and 336 participate in computing pixel 312. Persons skilled in the art will recognize that the actual number of source pixels used to compute a destination pixel depends on the blur angle and the number of increments through the blur angle, and may include just one source pixel or a very large number of source pixels.

FIG. 3C is a conceptual illustration of a cube face 360 of a destination cube map intersected by the current blur axis, according to one embodiment of the invention. Three coordinate axes 352, 353 and 354 are shown intersecting at the origin 351. Although, in one embodiment, all pixels on the destination cube face 360 are rendered, two pixels 361 and 362 are discussed herein for the purpose of illustration.

FIG. 3D is a conceptual illustration of pixels being sampled across blur angle projections 392 and 396 on a source cube face 380 intersected by the current blur axis, according to one embodiment of the invention. Again, point sampling is assumed in this discussion. Three orthogonal coordinate axes, x-axis 372, v-axis 373 and z-axis 374 are shown intersecting at an origin 371. The value of pixel 361 on destination cube face 360 of FIG. 3C is computed by sampling source pixels 381, 382 and 383 from source cube face 380, according to the weighted cosine computation discussed above. Likewise, the value of pixel 362 on destination cube face 360 of FIG. 3C is computed by sampling source pixels 384, 385 and 386 from source cube face 380, according to the weighted cosine computation discussed above.

As shown, blur angle 390 defines a blur angle projection 392 on source cube face 360, about the current blur axis relative to the position of a normal vector 391. In this case, the current blur axis is the z-axis 374. The blur angle projection 392 illustrates the sampling pattern on the source cube face 380, which includes pixels 381, 382 and 383, forming a arc-like pattern about the z-axis 374. Similarly, blur angle 394 defines a positive and a negative sample angle, about the current blur axis relative to the position of a normal vector 395. The blur angle 394 is shown wrapping a corresponding blur angle projection 396 in an arc-like pattern about the intersection point of the z-axis that includes pixels 384, 385 and 386. Here, arc formed about the z-axis 374 by blur angle projection 396 has a smaller radius relative to the arc formed by blur angle projection 392. Persons skilled in the art will recognize a special degenerate case when the normal vector is aligned to the current blur axis. In this special case, the blur angle projection is a point on the source cube face 380. Again, persons skilled in the art will recognize that the actual number of source pixels used to compute a destination pixel depends on the blur angle and the number of increments through the blur angle, and may include just one source pixel or a very large number of source pixels.

Figure 4:
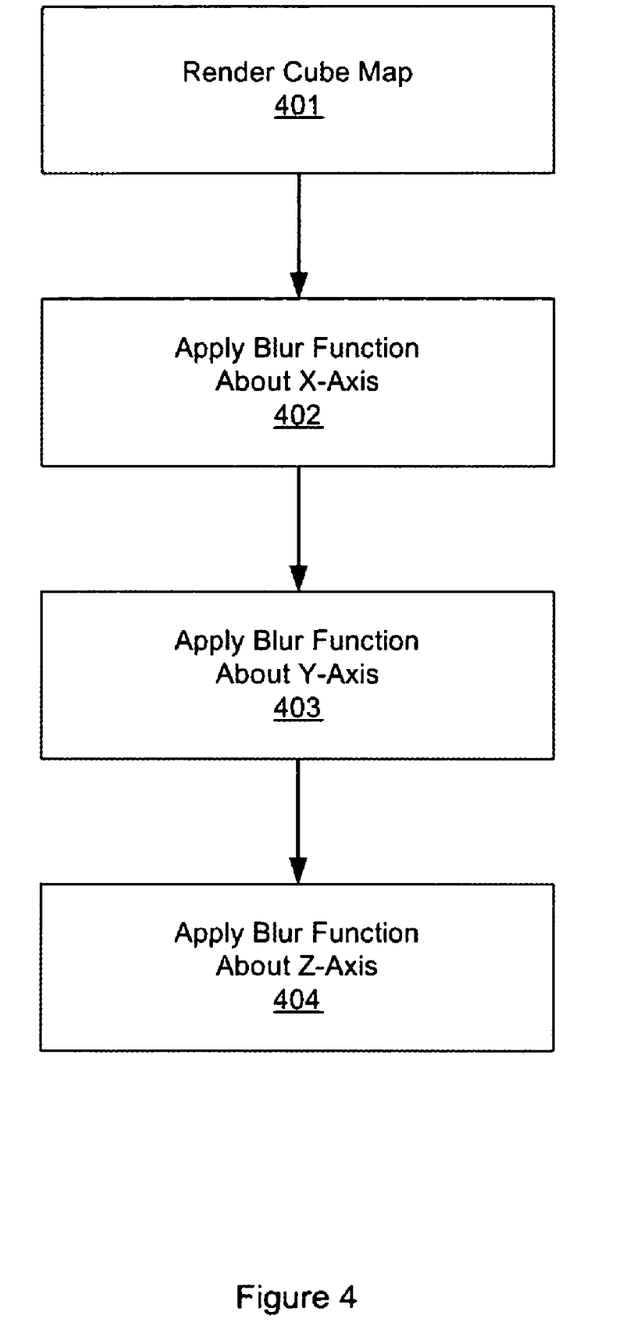
FIG. 4 is a flow diagram of method steps for conducting three sequential cylindrical blur operations on a rendered cube map, according to one embodiment of the invention.

FIG. 4 is a flow diagram of method steps for performing three sequential cylindrical blur operations on a rendered cube map, according to one embodiment of the invention. Although the method steps are described in conjunction with FIGS. 1, 2A-2B, 3A-3D and 7, persons skilled in the art will understand that any system that performs the method steps, in any order, is within the scope of the invention.

The method of conducting the three sequential cylindrical blur operations begins in step 401, where cube map 110 of FIG. 1 is rendered according to any technically feasible environment cube mapping techniques. The method then proceeds to step 402, where a first blur operation 120 about the x axis is applied to cube map 110 (the source cube map) to generate cube map 111 of FIG. 1 (the destination cube map). The method proceeds to step 403, where a second blur operation 121 about the y axis is applied to cube map 111 (the source cube map) to generate cube map 112 of FIG. 1 (the destination cube map). Finally, the method proceeds to step 404, where a third blur operation 122 about the z axis is applied to cube map 112 (the source cube map) to generate cube map 113 of FIG. 1 (the destination cube map). In one embodiment, the double-buffer technique described above in conjunction with FIG. 1 may be used for storing the respective source and destination cube maps generated using the method steps of FIG. 4.

Figure 5:
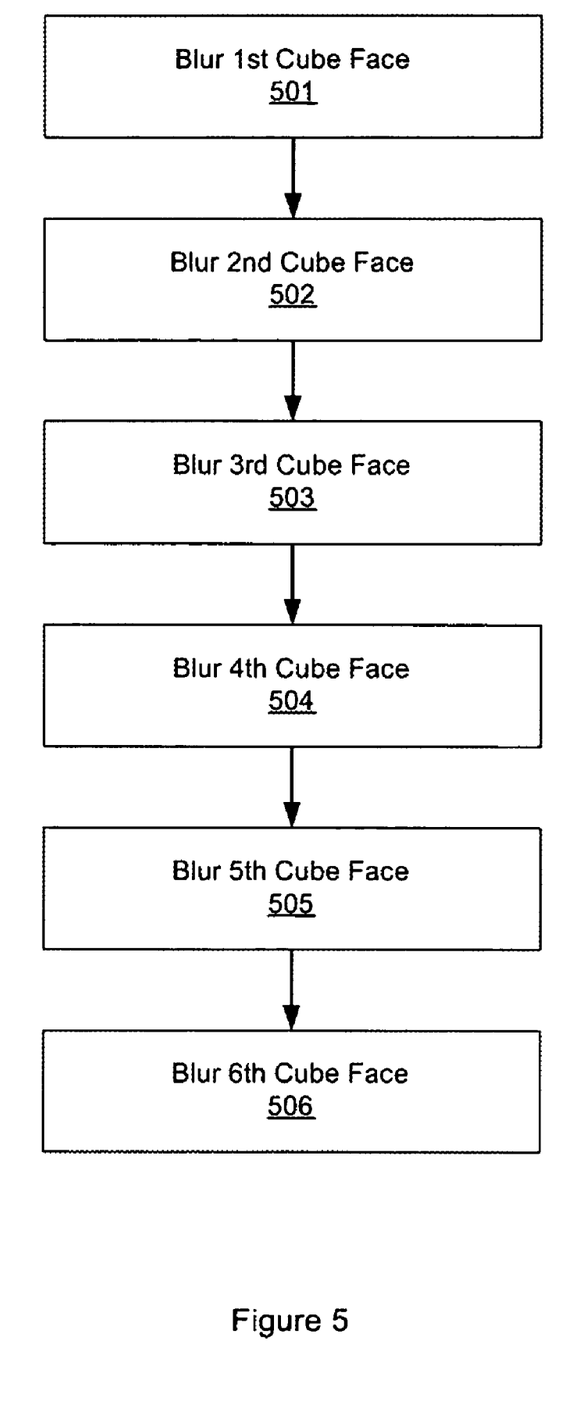
FIG. 5 is a flow diagram of method steps for conducting one of the three cylindrical blur operations on the six faces of the source cube map, according to one embodiment of the invention.

FIG. 5 is a flow diagram of method steps for conducting six sequential blur operations on each of the six faces of the source cube map, according to one embodiment of the invention. Although the method steps are described in conjunction with FIGS. 1, 2A-2B, 3A-3D and 7, persons skilled in the art will understand that any system that performs the method steps, in any order, is within the scope of the invention. For purposes of discussion only, it is assumed that the source cube map is being blurred in connection with step 402 of FIG. 4. Thus, the current blur axis is the x-axis, and cube map 110 of FIG. 1 is the source cube map.

The method of conducting six sequential blur operations begins in step 501, where the first cube face 130 of cube map 110 is blurred about the x-axis. The method proceeds to step 502, where the second cube face 131 of cube map 110 is blurred about the x-axis. The method proceeds to step 503, where the third cube face 132 of cube map 110 is blurred about the x-axis. The method proceeds to step 504, where the fourth cube face 133 of cube map 110 is blurred about the x-axis. The method proceeds to step 505, where the fifth cube face 134 of cube map 110 is blurred about the x-axis. Finally, the method proceeds to step 506, where the sixth cube face 135 of cube map 110 is blurred about the x-axis.

The method of FIG. 5 expands the method steps 402, 403 and 404 of FIG. 4, according to the current blur axis of each of those method steps.

Figure 6:
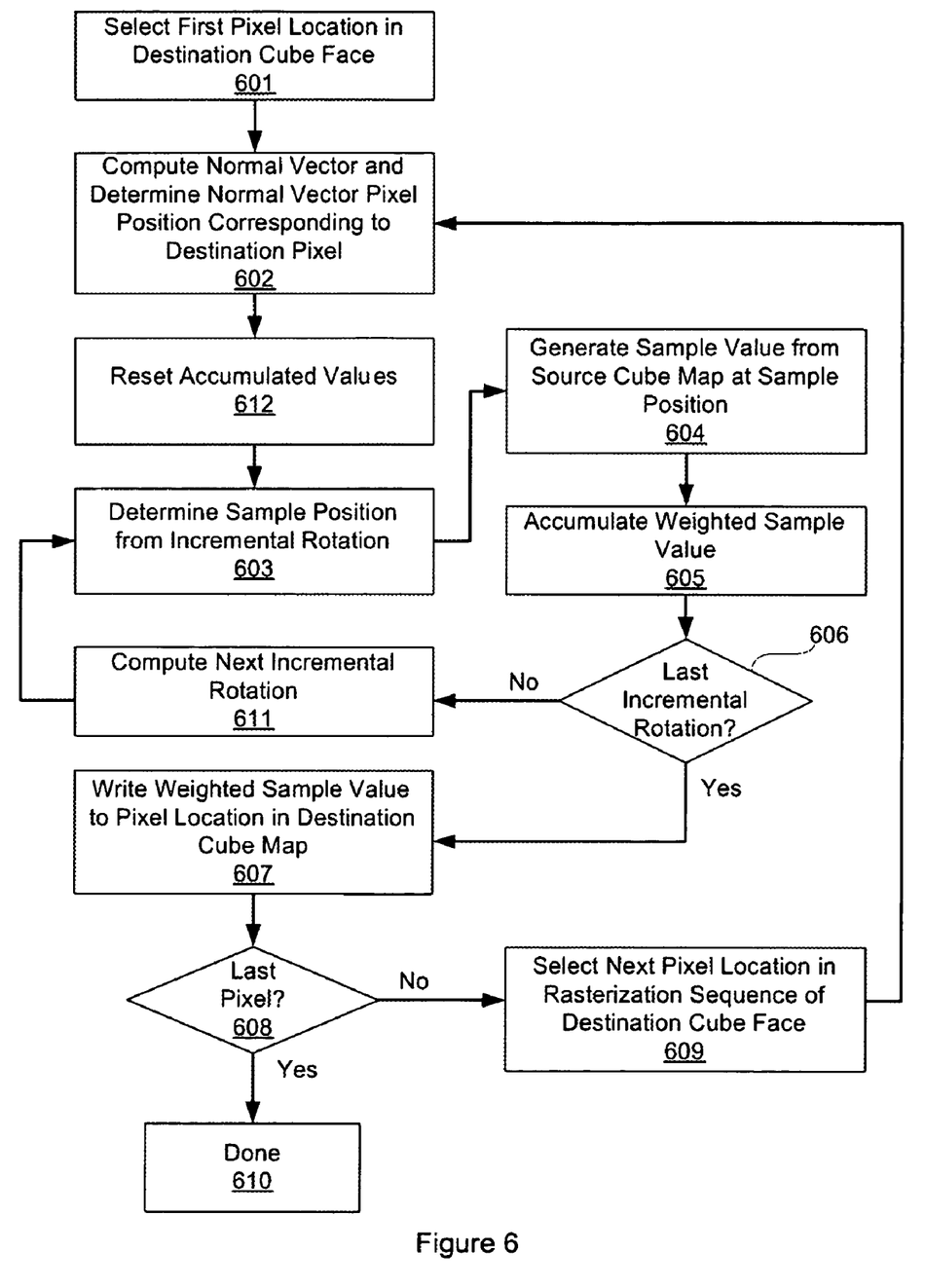
FIG. 6 is a flow diagram of method steps for conducting the six cylindrical blur operations on one face of the source cube map, according to one embodiment of the invention.

FIG. 6 is a flow diagram of method steps for conducting the blur operation on a selected cube face of the source cube map, according to one embodiment of the invention. Although the method steps are described in conjunction with FIGS. 1, 2A-2B, 3A3D and 7, persons skilled in the art will understand that any system that performs the method steps, in any order, is within the scope of the invention. For purposes of discussion only, it is assumed that the source cube face being blurred is the first cube face 130 of cube map 110 of FIG. 1 and that cube map 111 of FIG. 1 is the destination cube map. Again, the x-axis is the current blur axis.

The method of blurring a selected cube face begins in step 601, where a first pixel location in a cube face 140 of cube map 111 is selected, where the destination cube face 140 corresponds to the source cube face 130. The method proceeds to step 602, where a normal vector is computed using any technically feasible technique that defines a pixel location in cube face 130 corresponding to the location of the selected pixel in cube face 140. Again, this location is referred to as the normal vector pixel location. From step 602, the method proceeds to step 612, where the accumulated weighted sample values are reset in preparation for processing a new destination pixel. In step 603, the normal vector pixel location previously computed in step 602 is used in conjunction with the current incremental rotation about the blur axis (the x-axis) to determine a sample position. The method then proceeds to step 604, where a sample value is generated from the source cube map at the sample position. Example sampling techniques employed in step 604 may include point sampling, bilinear sampling, bicubic sampling or any other technically feasible sampling technique. The method then proceeds to step 605, where the sample value from step 604 is weighted and accumulated with other sample values associated with the destination pixel currently being computed. In one embodiment, a cosine weighted average is used to individually weight each sample. After step 605, the method proceeds to step 606, where a determination is made as to whether the last incremental rotation within the range defined by the blur angle has been reached. If the last incremental rotation defined by the blur angle has not been reached, then the method proceeds to step 611. In step 611, the next incremental rotation is computed. After step 611, the method proceeds to step 603, where the new incremental rotation is used to determine a new sample position. If, in step 606, a determination is made that the last incremental rotation defined by the blur angle had been reached, then the method proceeds to step 607, where the accumulated, blended sample value is written to the destination pixel location in the destination cube map.

After step 607, the method then proceeds to step 608, where a determination is made as to whether all of the pixels in cube face 140 (the destination cube face) have been computed. If all of the pixels have been computed, then the method completes in step 610. If all of the pixels have not been computed, then the method proceeds to step 609, where the next pixel location in the rasterization sequence for cube face 130 is selected (for example, rasterization sequence 252 of FIG. 2A). From step 609, the method returns to step 602.

The method of FIG. 6 expands the method steps 501, 502, 503, 504, 505 and 506 of FIG. 5, according to the destination cube face blurred in each of those method steps.

Figure 7:
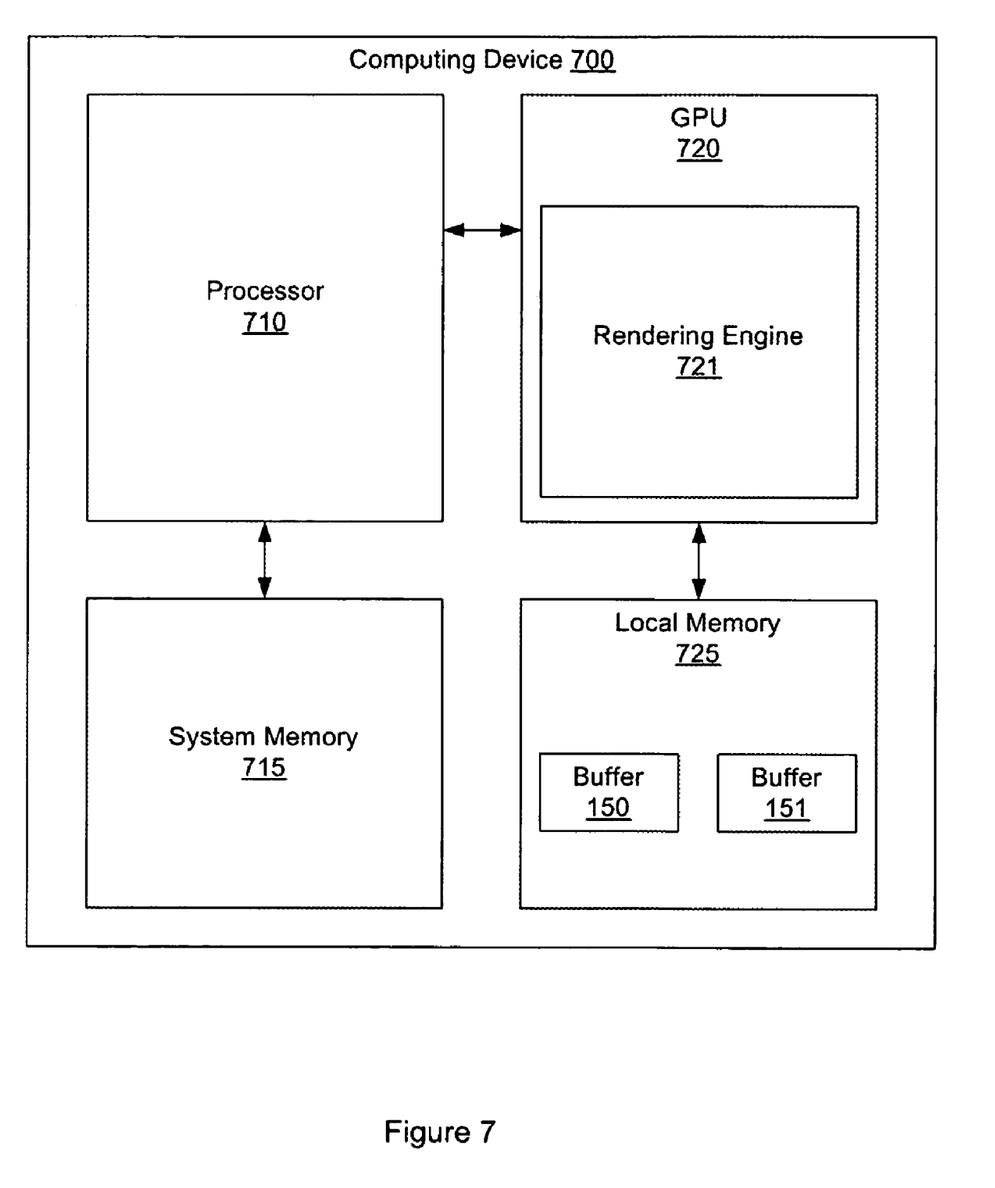
FIG. 7 is a conceptual diagram of a computing device configured to implement one or more aspects of the present invention.

FIG. 7 is a conceptual diagram of a computing device configured to implement one or more aspects of the present invention. The computing device 700 includes, without limitation, a processor 710, system memory 715, a graphics processing unit (GPU) 720 and local memory 725 connected to the GPU 720. The GPU 720 includes at least one rendering engine 721 used to process data. In one embodiment, the local memory 725 has two buffers, buffer 150 and buffer 151 of FIG. 1, allocated to store source and destination cube map data operated on using the techniques described herein.

While the forgoing is directed to embodiments of the present invention, other and further embodiments of the invention may be devised without departing from the basic scope thereof, and the scope thereof is determined by the claims that follow.

In one embodiment of the invention, a computer-readable medium stores instructions for causing a computing device to render a cube map using a spherical blur function by performing the steps of selecting a first pixel location on a first face of a first destination cube map that has at least six faces; computing a normal vector associated with the first pixel; determining a normal vector pixel location on a first face of a source cube map that corresponds to the first pixel location on the first face of the first destination cube map; determining a plurality of sample positions relative to the normal vector pixel location; generating a sample value for each sample position in the plurality of sample positions; generating a blended sample value based on the computed sample values; and writing the blended sample value to the first pixel location on the first face of the first destination cube map.

We claim:

1. A method for rendering a cube map using a spherical blur function, the method comprising:
    selecting a first pixel location on a first face of a first destination cube map that has at least six faces;
    computing, within a processor, a normal vector associated with the first pixel;
    determining, based on the normal vector, a normal vector pixel location on a first face of a source cube map that corresponds to the first pixel location on the first face of the first destination cube map, wherein the source cube map and the first destination cube map are different cube maps;
    computing a blur radius based on a positive sampling angle and a negative sampling angle about a first blur axis that intersects the first face of the source cube map at the normal vector pixel location;
    determining a plurality of sample positions on the first face of the source cube map based on the blur radius;
    generating a sample value for each sample position in the plurality of sample positions;
    generating a blended sample value based on the computed sample values; and
    writing the blended sample value to the first pixel location on the first face of the first destination cube map.

2. The method of claim 1, wherein the step of generating a sample value includes point sampling.

3. The method of claim 1, wherein the step of generating a sample value includes bilinear sampling.

4. The method of claim 1, wherein the step of generating a sample value includes bicubic sampling.

5. The method of claim 1, wherein the step of generating a blended sample value includes cosine weighted averaging the generated sample values.

6. The method of claim 1, wherein the step of generating a blended sample value includes equal weighted averaging the generated sample values.

7. The method of claim 1, wherein the first blur axis is a first axis of a Cartesian coordinate frame.

8. The method of claim 7, wherein the steps of selecting a pixel location, computing a normal vector, determining a normal vector pixel location, determining a plurality of sample positions, generating a sample value, generating a blended sample value, and writing the blended sample value are repeated for each pixel position on the first face of the first destination cube map.

9. The method of claim 8, wherein the steps of selecting a pixel location, computing a normal vector, determining a normal vector pixel location, determining a plurality of sample positions, generating a sample value, generating a blended sample value, and writing the blended sample value are executed for a plurality of pixel positions on each of the other five faces of the first destination cube map.

10. The method of claim 9, wherein a second destination cube map is generated by repeating the steps of selecting a pixel location, computing a normal vector, determining a normal vector pixel location, determining a plurality of sample positions, generating a sample value, generating a blended sample value, and writing the blended sample value for a plurality of pixel positions on each face of the second destination cube map, with the first destination cube map being used as the source cube map, and the step of determining the plurality of sampling points comprising incrementally rotating about a second blur axis relative to the normal vector pixel location, the second blur axis being a second axis of the Cartesian coordinate frame.

11. The method of claim 10, wherein a third destination cube map is generated by repeating the steps of selecting a pixel location, computing a normal vector, determining a normal vector pixel location, determining a plurality of sample positions, computing a sample value, generating a blended sample value, and writing the blended sample value for a plurality of pixel positions on each face of the third destination cube map, with the second destination cube map being used as the source cube map, and the step of determining the plurality of sampling points comprising incrementally rotating about a third blur axis relative to the normal vector pixel location, the third blur axis being a third axis of the Cartesian coordinate frame.

12. A non-transitory computer-readable medium storing instructions for causing a computing device to render a cube map using a spherical blur function by performing the steps of:
    selecting a first pixel location on a first face of a first destination cube map that has at least six faces;
    computing a normal vector associated with the first pixel;

determining, based on the normal vector, a normal vector pixel location on a first face of a source cube map that corresponds to the first pixel location on the first face of the first destination cube map, wherein the source cube map and the first destination cube map are different cube maps;

computing a blur radius based on a positive sampling angle and a negative sampling angle about a first blur axis that intersects the first face of the source cube map at the normal vector pixel location;

determining a plurality of sample positions on the first face of the source cube map based on the blur radius;

generating a sample value for each sample position in the plurality of sample positions;

generating a blended sample value based on the computed sample values; and writing the blended sample value to the first pixel location on the first face of the first destination cube map.

13. The non-transitory computer-readable medium of claim 12, wherein the step of generating a sample value includes point sampling.

14. The non-transitory computer-readable medium of claim 12, wherein the step of generating a sample value includes bilinear sampling.

15. The non-transitory computer-readable medium of claim 12, wherein the step of generating a sample value includes bicubic sampling.

16. The non-transitory computer-readable medium of claim 12, wherein the step of generating a blended sample value includes cosine weighted averaging the computed sample values.

17. The non-transitory computer-readable medium of claim 12, wherein the step of generating a blended sample value includes equal weighted averaging the computed sample values.

18. The non-transitory computer-readable medium of claim 12, wherein the first blur axis is a first axis of a Cartesian coordinate frame.

19. The non-transitory computer-readable medium of claim 18, wherein the steps of selecting a pixel location, computing a normal vector, determining a normal vector pixel location, determining a plurality of sample positions, generating a sample value, generating a blended sample value, and writing the blended sample value are repeated for each pixel position on the first face of the first destination cube map.

20. The non-transitory computer-readable medium of claim 19, wherein the steps of selecting a pixel location, computing a normal vector, determining a normal vector pixel location, determining a plurality of sample positions, generating a sample value, generating a blended sample value, and writing the blended sample value are executed for a plurality of pixel positions on each of the other five faces of the first destination cube map.

21. The non-transitory computer-readable medium of claim 20, wherein a second destination cube map is generated by repeating the steps of selecting a pixel location, computing a normal vector, determining a normal vector pixel location, determining a plurality of sample positions, generating a sample value, generating a blended sample value, and writing the blended sample value for a plurality of pixel positions on each face of the second destination cube map, with the first destination cube map being used as the source cube map, and the step of determining the plurality of sampling points comprising incrementally rotating about a second blur axis relative to the normal vector pixel location, the second blur axis being a second axis of the Cartesian coordinate frame.

22. The non-transitory computer-readable medium of claim 21, wherein a third destination cube map is generated by repeating the steps of selecting a pixel location, computing a normal vector, determining a normal vector pixel location, determining a plurality of sample positions, generating a sample value, generating a blended sample value, and writing the blended sample value for a plurality of pixel positions on each face of the third destination cube map, with the second destination cube map being used as the source cube map, and the step of determining the plurality of sampling points comprising incrementally rotating about a third blur axis relative to the normal vector pixel location, the third blur axis being a third axis of the Cartesian coordinate frame.

23. A computing device configured to render a cube map using a spherical blur function, the computing device comprising:
a processing device; and
a memory that includes a program having instructions for causing the processing device to render a cube map using a spherical blur function by performing the steps of:
selecting a first pixel location on a first face of a first destination cube map that has at least six faces,
computing a normal vector associated with the first pixel,
determining, based on the normal vector, a normal vector pixel location on a first face of a source cube map that corresponds to the first pixel location on the first face of the first destination cube map, wherein the source cube map and the first destination cube map are different cube maps,
computing a blur radius based on a positive sampling angle and a negative sampling angle about a first blur axis that intersects the first face of the source cube map at the normal vector pixel location,
determining a plurality of sample positions on the first face of the source cube map based on the blur radius,
generating a sample value for each sample position in the plurality of sample positions,
generating a blended sample value based on the computed sample values, and
writing the blended sample value to the first pixel location on the first face of the first destination cube map.

24. The computing device of claim 23, further comprising a first buffer for storing the source cube map and a second buffer for storing the destination cube map.

* * * * *